US012810156B2

(12) United States Patent
Browder et al.

(10) Patent No.: US 12,810,156 B2
(45) Date of Patent: Nov. 24, 2026

(54) APPARATUS AND METHOD FOR MACHINE-LEARNING MODEL OPTIMIZATION FOR DATA ATTRIBUTES

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 153 days.

(21) Appl. No.: 18/958,471

(22) Filed: Nov. 25, 2024

(65) Prior Publication Data

US 2026/0148059 A1 May 28, 2026

(51) Int. Cl.
*G06N 3/08* (2023.01)

(52) U.S. Cl.
CPC .................................... *G06N 3/08* (2013.01)

(58) Field of Classification Search
CPC .................................................. G06N 3/08
See application file for complete search history.

(56) References Cited

U.S. PATENT DOCUMENTS

| | | | | |
|---|---|---|---|---|
| 8,666,771 | B2 | 3/2014 | Roesch et al. | |
| 9,311,449 | B2 | 4/2016 | Levin et al. | |
| 11,461,723 | B2 | 10/2022 | Balan | |
| 12,488,244 | B1 * | 12/2025 | Uva | G06N 3/08 |
| 12,511,349 | B1 * | 12/2025 | Yang | G06F 18/285 |
| 2005/0076050 | A1 * | 4/2005 | Wilcockson | G06F 16/904 707/999.102 |
| 2021/0342707 | A1 * | 11/2021 | Xu | G06N 20/20 |
| 2022/0084204 | A1 * | 3/2022 | Li | G06N 3/08 |
| 2022/0116388 | A1 * | 4/2022 | Johnson | G10L 25/72 |
| 2022/0116415 | A1 * | 4/2022 | Burgis | G06Q 20/12 |
| 2023/0008936 | A1 | 1/2023 | Adhikari et al. | |
| 2023/0011521 | A1 | 1/2023 | Balakrishnan et al. | |

(Continued)

FOREIGN PATENT DOCUMENTS

| | | | | |
|---|---|---|---|---|
| CN | 119598250 | A * | 3/2025 | G06N 3/08 |
| IN | 202131050401 | A | 12/2021 | |
| KR | 20240081703 | A | 6/2024 | |

OTHER PUBLICATIONS

Dey, "Bagging v/s Boosting", Jan. 30, 2024 (Year: 2024).*

(Continued)

*Primary Examiner* — Usmaan Saeed
(74) *Attorney, Agent, or Firm* — CALDWELL LLC

(57) ABSTRACT

An apparatus and method for machine-learning model optimization for data attributes are disclosed. The apparatus includes at least a processor and a memory communicatively connected to the at least a processor, wherein the memory contains instructions configuring the at least a processor to receive input data, extract a plurality of attributes from the input data, generate an optimized machine-learning module including a plurality of optimized machine-learning models, select at least one optimized machine-learning model from a plurality of trained optimized machine-learning models as a function of the plurality of attributes and generate output data as a function of the input data and the plurality of attributes using the selected optimized machine-learning model.

18 Claims, 9 Drawing Sheets

(56) References Cited

U.S. PATENT DOCUMENTS

| | | | | |
|---|---|---|---|---|
| 2023/0317292 | A1* | 10/2023 | Mikhno | G16H 50/20 600/365 |
| 2024/0169193 | A1* | 5/2024 | Bews | G06F 30/13 |
| 2024/0340502 | A1* | 10/2024 | Michurin | H04N 21/8547 |
| 2024/0370723 | A1* | 11/2024 | Bisson-Krol | G06N 3/08 |
| 2024/0420026 | A1* | 12/2024 | Breeding-Allison | G06Q 30/0201 |
| 2025/0225434 | A1* | 7/2025 | Smith | G06F 18/2321 |

OTHER PUBLICATIONS

Ozdemir, Ozancan, Performance comparison of Machine learning Methods and Traditional Time Series Methods for Forecasting, Aug. 2020, Department, Middle East Technical University, pp. i-xxviii-1-147 (Year: 2020) (Year: 2020).*

* cited by examiner

APPARATUS AND METHOD FOR MACHINE-LEARNING MODEL OPTIMIZATION FOR DATA ATTRIBUTES

FIELD OF THE INVENTION

The present invention generally relates to the field of artificial intelligence. In particular, the present invention is directed to an apparatus and method for machine-learning model optimization for data attributes.

BACKGROUND

Machine-learning model optimization is an essential process in artificial intelligence and data science that focuses on improving the performance, efficiency, and accuracy of machine-learning models for specific tasks or datasets. Traditional machine-learning models may struggle to handle complex and dynamic data efficiently.

SUMMARY OF THE DISCLOSURE

In an aspect, an apparatus for machine-learning model optimization for data attributes is disclosed. The apparatus includes at least a processor and a memory communicatively connected to the at least a processor, wherein the memory contains instructions configuring the at least a processor to receive input data, extract a plurality of attributes from the input data, generate an optimized machine-learning module including a plurality of optimized machine-learning models, wherein generating the optimized machine-learning module includes generating a plurality of sets of optimization training data, wherein each set of the plurality of sets of optimization training data comprises exemplary input data with different attributes correlated to exemplary output data and training each of the plurality of optimized machine-learning models using each of the plurality of sets of optimization training data, select at least one optimized machine-learning model from the plurality of trained optimized machine-learning models as a function of the plurality of attributes, wherein selecting the at least one optimized machine-learning model includes generating data samples as a function of the input data, determining a compatibility score of the plurality of trained optimized machine-learning model with the input data using the data samples and selecting the at least one optimized machine-learning model as a function of the compatibility score and the plurality of attributes and generate output data as a function of the input data and the plurality of attributes using the selected optimized machine-learning model.

In another aspect, a method for machine-learning model optimization for data attributes is disclosed. The method includes receiving, using at least a processor, input data, extracting, using the at least a processor, a plurality of attributes from the input data, generating, using the at least a processor, an optimized machine-learning module including a plurality of optimized machine-learning models, wherein generating the optimized machine-learning module includes generating a plurality of sets of optimization training data, wherein each set of the plurality of sets of optimization training data includes exemplary input data with different attributes correlated to exemplary output data and training each of the plurality of optimized machine-learning models using each of the plurality of sets of optimization training data, selecting, using the at least a processor, at least one optimized machine-learning model from the plurality of trained optimized machine-learning models as a function of the plurality of attributes, wherein selecting the at least one optimized machine-learning model includes generating data samples as a function of the input data, determining a compatibility score of the plurality of trained optimized machine-learning model with the input data using the data samples and selecting the at least one optimized machine-learning model as a function of the compatibility score and the plurality of attributes and generating, using the at least a processor, output data as a function of the input data and the plurality of attributes using the selected optimized machine-learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for machine-learning model optimization for data attributes. The apparatus includes at least a processor and a memory communicatively connected to the at least a processor, wherein the memory contains instructions configuring the at least a processor to receive input data, extract a plurality of attributes from the input data, generate an optimized machine-learning module including a plurality of optimized machine-learning models, wherein generating the optimized machine-learning module includes generating a plurality of sets of optimization training data, wherein each set of the plurality of sets of optimization training data comprises exemplary input data with different attributes correlated to exemplary output data and training each of the plurality of optimized machine-learning models using each of the plurality of sets of optimization training data, select at least one optimized machine-learning model from the plurality of trained optimized machine-learning models as a function of the plurality of attributes, wherein selecting the at least one optimized machine-learning model includes generating data samples as a function of the input data, determining a compatibility score of the plurality of trained optimized machine-learning model with the input data using the data samples and selecting the at least one optimized machine-learning model as a function of the compatibility score and the plurality of attributes and generate output data as a function of the input data and the plurality of attributes using the selected optimized machine-learning model.

Aspects of the present disclosure can be used to address a challenge of selecting an optimized machine-learning model for processing or generating predictions from a particular type of data by evaluating and determining the model best suited for the specific data characteristics.

Aspects of the present disclosure can also be used to display data in a graphical user interface. Exemplary embodiments illustrating aspects of the present disclosure are described below in the context of several specific examples.

Figure 1:
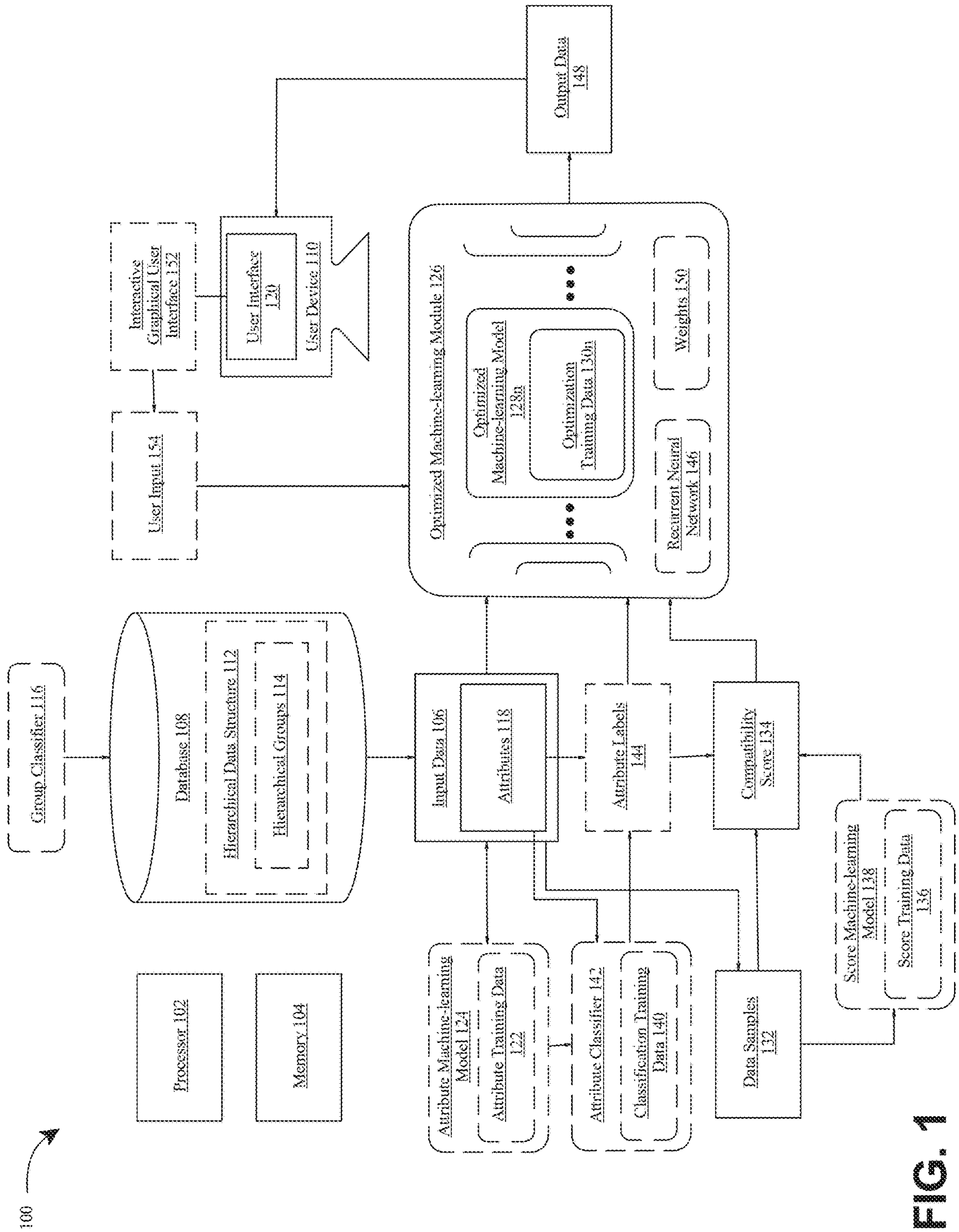
FIG. 1 illustrates a block diagram of an exemplary apparatus for machine-learning model optimization for data attributes.

Referring now to FIG. 1, an exemplary embodiment of an apparatus 100 for machine-learning model optimization for data attributes is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 contains instructions configuring processor 102 to receive input data 106. For the purposes of this disclosure, "input data" is data that is input into an apparatus 100. In some embodiments, input data 106 may include various formats, including texts, images, audio, video, unstructured data or structured data. In some embodiments, input data 106 may include image data. For the purposes of this disclosure, "image data" is digital representations of visual information. As a non-limiting example, image data may include images of facilities, document, subjects, medical professionals, and the like.

With continued reference to FIG. 1, in some embodiments, input data 106 may include information related to a facility. For the purposes of this disclosure, a "facility" is a physical location or building. As a non-limiting example, a facility may include hospital, factory, health care center, behavioral health center, and the like. For example, and without limitation, input data 106 may include bill, cost, expense reports, invoices, financial statements, insurance claims, pricing information, and records of transactions associated with the facility. For example, and without limitation, input data 106 may include operational data such as inventory logs, staffing schedules, patient or client records, production metrics, maintenance reports, utility usage data, and the like. For example, and without limitation, input data 106 may include compliance and regulatory information, such as licensing records, safety inspection reports, and certification documents relevant to the facility's operations. For example, and without limitation, input data 106 may include images (image data) of facilities, such as photographs, documents, or records of hospital premises, factory layouts, equipment setups, healthcare center interiors, or behavioral health center rooms.

With continued reference to FIG. 1, in some embodiments, input data 106 may include information related to a subject. For the purposes of this disclosure, a "subject" is an individual, entity, or group whose information is being collected. As a non-limiting example, subject may include a patient. For example, and without limitation, input data 106 may include a subject's personal information, such as name, date of birth, address, contact details, identification numbers (e.g., social security number or patient ID), and the like. For example, and without limitation, input data 106 may include medical information, including medical history, current diagnoses, prescribed medications, treatment plans, test results, imaging data, and health insurance details. For example, and without limitation, input data 106 may include clinical notes, doctor's observations, vital signs, and records of interactions with healthcare providers, such as appointments, follow-up schedules, and referrals. For example, and without limitation, input data 106 may include financial records related to the subject, such as billing statements, insurance claims, payment history, and invoices for medical services.

With continued reference to FIG. 1, in some embodiments, input data 106 may include information related to medical professionals. For example, and without limitation, input data 106 may include medical professionals' experience, personal information, qualifications, specializations, certification details, and the like. For example, and without limitation, input data 106 may include names, contact information, license numbers, education history, years of practice, affiliated institutions, and the like.

With continued reference to FIG. 1, in some embodiments, processor 102 may receive input data 106 from one or more data sources. for the purposes of this disclosure, a "data source" is an origin or repository from which data is obtained. As a non-limiting example, data source may include database 108, data crawler, user device 110, application programming interfaces (APIs), and the like. In some embodiments, apparatus 100 may include a database 108. As used in this disclosure, "database" is a data structure configured to store data related to input data. In one or more embodiments, database 108 may include inputted or calculated information and datum related to input data 106. In some embodiments, a datum history may be stored in database 108. As a non-limiting example, the datum history may include real-time and/or previous inputted data related to input data 106. As a non-limiting example, database 108 may include instructions from a user, who may be an expert user, a past user in embodiments disclosed herein, or the like, where the instructions may include examples of the data related to input data 106. In some embodiments, database 108 may include a hierarchical data structure 112 correlated to one or more hierarchical groups 114 generated by a group classifier 116. For the purposes of this disclosure, a "hierarchical data structure" is structured organization of data that is organized into multiple hierarchical nodes. In some embodiments, hierarchical data structure 112 may provide a summarization, representation, or otherwise abstraction of hierarchical group 114. For the purposes of this disclosure, a "hierarchical group" is a set of associative attributes that are organized into multiple hierarchical levels or tiers. As a non-limiting example, hierarchical group 114 may include geographical location group, hospital group, and the like. In a non-limiting example, each hierarchical levels or tiers may represent different degree of generalization or specificity. Within hierarchical group 114, attributes 118 may be arranged in a manner that establishes hierarchical relationships, where attributes 118 at higher levels in hierarchical relationship can encompass or influence attributes 118 at lower levels in hierarchical relationship. Additional disclosures related to hierarchical data structure 112 and hierarchical groups 114 are found in U.S. Nonprovisional patent application Ser. No. 18/957,601, filed on Nov. 22, 2024, and titled "APPARATUS AND METHOD FOR GENERATIVE INTERPOLATION,", the entirety of which is incorporated as a reference.

With continued reference to FIG. 1, in some embodiments, processor 102 may be communicatively connected with database 108. For example, and without limitation, in some cases, database 108 may be local to processor 102. In another example, and without limitation, database 108 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store database 108. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, database 108 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, input data 106 may be derived from a data crawler. A "data crawler," as used herein, is a program that systematically browses the internet for the purpose of Web indexing. The data crawler may be seeded with platform URLs, wherein the crawler may then visit the next related URL, retrieve the content, index the content, and/or measures the relevance of the content to the topic of interest. In some embodiments, processor 102 may generate data crawler to scrape input data 106 from web sources. data crawler may be seeded and/or trained with a reputable website to begin the search. Data crawler may be generated by processor 102. In some embodiments, data crawler may be trained with information received from user through a user interface 120. In some embodiments, data crawler may be configured to generate a web query. A web query may include search criteria received from user. For example, user may submit a plurality of websites for data crawler to search to input data 106. Additionally, data crawler function may be configured to search for and/or detect one or more data patterns. A "data pattern" as used in this disclosure is any repeating forms of information. In some embodiments, data crawler may be configured to determine the relevancy of a data pattern. Relevancy may be determined by a relevancy score. A relevancy score may be automatically generated by processor 102, received from a machine learning model, and/or received from user. In some embodiments, a relevancy score may include a range of numerical values that may correspond to a relevancy strength of data received from a data crawler function. As a non-limiting example, a data crawler function may search the Internet for input data 106.

With continued reference to FIG. 1, for the purposes of this disclosure, a "user device" is any device a user use to input data. As a non-limiting example, user device 110 may include a laptop, desktop, tablet, mobile phone, smart phone, smart watch, kiosk, screen, smart headset, or things of the like. In some embodiments, user device 110 may include an interface configured to receive inputs from a user. In some embodiments, user may manually input any data into apparatus 100 using user device 110. In some embodiments, user may have a capability to process, store or transmit any information independently.

With continued reference to FIG. 1, memory 104 contains instructions configuring processor 102 to extract a plurality of attributes 118 from input data 106. For the purposes of this disclosure, an "attribute" is a characteristic of input data. In some embodiments, attribute 118 may include a data type. As a non-limiting example, attribute 118 may include a data type such as text (e.g., clinical notes, patient comments), number (e.g., age, lab values, medication dosage, cost measurements, quantities, coordinates), date/time (e.g., admission and discharge times, appointment schedules), categorical (e.g., diagnosis codes, department names), visual features (e.g., shapes, colors, patterns, edges), and the like. In some embodiments, attribute 118 may include context of input data 106. As a non-limiting example, attribute 118 may include financial context (e.g., cost of procedures, patient billing information), demand context (e.g., real-time demand for services in facility), usage context (e.g., utilization rates of hospital resources like ICU beds, MRI machines, or operating rooms), patient care context (e.g., patient acuity levels, care pathway details, or frequency of check-ups), and the like.

With continued reference FIG. 1, in some embodiments, extracting a plurality of attributes 118 may include extracting image-based attributes of a plurality of attributes 118 from image data of input data 106 using a machine vision module and converting the image-based attributes into machine-readable data. For the purposes of this disclosure, an "image-based attribute" is a feature, property, or data point that is extracted from image data. As a non-limiting example, image-based attribute may include patterns, edges, contours, shapes, textures, and the like. For example, and without limitation, image-based attribute may include coordinates or relative location of different equipment within a facility floor in an image of a facility. For example, and without limitation, image-based attribute may include an outline or footprint of different operational areas within a facility in a document of facility layout. For the purposes of this disclosure, "machine-readable data" data that is structured and formatted in a way that can be processed, interpreted, and used by a computer. As a non-limiting example, machine-readable data may include various formats, such as JSON, XML, CSV, binary formats, and the like.

With continued reference to FIG. 1, in some embodiments, processor 102 may be configured to analyze input data 106 using machine vision module to extract image-based attributes. For the purposes of this disclosure, a "machine vision module" is a type of technology that enables a computing device to inspect, evaluate and identify still or moving images. For example, in some cases a machine vision module may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, alternatively or additionally, identifying image-based attribute may include classifying the shape of the image-based attribute to a label of the image-based attribute using an image classifier; the image classifier may be trained using a plurality of images and labels of image-based attributes. The image classifier may be configured to determine which of a plurality of edge-detected shapes is closest to an image-based attributes as determined by training using training data and selecting the determined shape as the image-based attribute. As a non-limiting example, the image classifier may be trained with image training data that correlates the plurality of images of image-based attributes to a label of the image-based attributes. Alternatively, identification of the image-based attribute may be performed without using computer vision and/or classification; for instance, identifying the image-based attribute may further include receiving, from a user, an identification of the image-based attribute in an image (image data).

With continued reference FIG. 1, in some embodiments, extracting a plurality of attributes 118 may include extracting text-based attributes of the plurality of attributes 118 from image data of input data 106 using an optical character recognition. For the purposes of this disclosure, a "text-based attribute" is a characteristic that consists of text. As a non-limiting example, text-based attribute may include textual information, such as names, dates, addresses, identification numbers, medical terms, keywords, or labels. For example, and without limitation, an image of a document (image data) may contain at text-based attribute like detected words, paragraphs, table structures, or logos. As another non-limiting example, text-based attribute may include numerical values, such as prices, measurements, quantities, coordinates, or time stamps.

With continued reference to FIG. 1, in some embodiments, processor 102 may analyze input data 106 (e.g., image) to find text-based attributes using optical character recognition (OCR). For the purposes of this disclosure, "optical character recognition" is a technology that enables the recognition and conversion of printed or written text into machine-encoded text. In some cases, the at least a processor 102 may be configured to recognize a keyword using the OCR to find text-based attributes. As used in this disclosure, a "keyword" is an element of word or syntax used to identify and/or match elements to each other. In some cases, the at least a processor 102 may transcribe much or even substantially all input data 106.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from input data 106 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of input data 106. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the input data 106 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 5. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes input data 106. Since the adaptive classifier may have learned something useful a little too late to recognize characters on the first pass, a second pass may be run over the input data 106. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 102 may be configured to generate attribute training data 122. In a non-limiting example, attribute training data 122 may include correlations between exemplary input data and exemplary attributes. In some embodiments, attribute training data 122 may be stored in database 108. In some embodiments, attribute training data 122 may be received from one or more users, database 108, external computing devices, and/or previous iterations of processing. As a non-limiting example, attribute training data 122 may include instructions from a user, who may be an expert user, a past user in embodiments disclosed herein, or the like, which may be stored in memory and/or stored in database 108, where the instructions may include labeling of training examples. In some embodiments, attribute training data 122 may be updated iteratively on a feedback loop. As a non-limiting example, processor 102 may update attribute training data 122 iteratively through a feedback loop as a function of input data 106, output of machine vision module, optical character recognition, or the like. In some embodiments, processor 102 may be configured to generate attribute machine-learning model 124. In a non-limiting example, generating attribute machine-learning model 124 may include training, retraining, or fine-tuning attribute machine-learning model 124 using attribute training data 122 or updated attribute training data 122. In some embodiments, processor 102 may be configured to extract attribute 118 from input data 106 using attribute machine-learning model 124 (i.e. trained or updated attribute machine-learning model 124). In some embodiments, generating training data and training machine-learning models may be simultaneous.

With continued reference to FIG. 1, memory 104 contains instructions configuring processor 102 to generate an optimized machine-learning module 126 including a plurality of optimized machine-learning models 128*a-n*. For the purposes of this disclosure, an "optimized machine-learning module" is a component that includes a plurality of optimized machine-learning models and associated functionalities for managing, processing, or applying the models. For the purposes of this disclosure, an "optimized machine-learning model" is a data structure representing and/or instantiating a mathematical and/or algorithmic representation of a relationship between input data and output data. In some embodiments, each optimized machine-learning models 128*a-n* may process input data 106 with different attributes 118. In some embodiments, each optimized machine-learning models 128 within optimized machine-learning module 126 may be optimized to handle specific attributes 118, such as data type (e.g., text, numerical, categorical) or data context (e.g., clinical, financial, operational). For example, and without limitation, one optimized machine-learning models 128 may be configured to analyze textual data such as physician notes, while another optimized machine-learning models 128 may focus on numerical attributes such as cost of operations.

With continued reference to FIG. 1, generating optimized machine-learning module 126 includes generating a plurality of sets of optimization training data 130*a-n* and training each of the plurality of optimized machine-learning models using each of the plurality of sets of optimization training data 130*a-n*. For the purposes of this disclosure, "optimization training data" is data containing correlations that a machine-learning process may use to model relationships between input data and output data. Each set of a plurality of sets of optimization training data 130*a-n* includes exemplary input data with different attributes correlated to exemplary output data. As a non-limiting example, first set of optimization training data 130*a-n* may include correlations between input data with textual data (attributes 118) and output data and second set of optimization training data 130*a-n* may include correlations between input data with numerical data (attributes 118) and output data. As another non-limiting example, first set of optimization training data 130*a-n* may include correlations between input data with financial context (attributes 118) and output data and second set of optimization training data 130*a-n* may include correlations between input data with operational context (attributes 118) and output data. In some embodiments, optimization training data 130*a-n* may be stored in database 108. In some embodiments, optimization training data 130*a-n* may be received from one or more users, database 108, external computing devices, and/or previous iterations of processing. As a non-limiting example, optimization training data 130*a-n* may include instructions from a user, who may be an expert user, a past user in embodiments disclosed herein, or the like, which may be stored in memory and/or stored in database 108, where the instructions may include labeling of training examples. In some embodiments, optimization training data 130*a-n* may be updated iteratively on a feedback loop. As a non-limiting example, processor 102 may update optimization training data 130*a-n* iteratively through a feedback loop as a function of input data 106, attribute 118, output of any machine-learning models described in this disclosure, or the like. In a non-limiting example, generating optimized machine-learning models 128*a-n* may include training, retraining, or fine-tuning optimized machine-learning models 128*a-n* using optimization training data 130*a-n* or updated optimization training data 130*a-n*. In some embodiments, generating training data and training machine-learning models may be simultaneous.

With continued reference to FIG. 1, memory 104 contains instructions configuring processor 102 to select at least one optimized machine-learning models 128 from a plurality of trained optimized machine-learning models 128*a-n* as a function of plurality of attributes 118. In a non-limiting example, selecting one optimized machine-learning models 128 from the plurality of trained optimized machine-learning models 128*a-n* as a function of plurality of attributes may refer to selecting one optimized machine-learning models 128 that can process input data 106 that has a specific attribute 118 (e.g., data type or context). Selecting at least one optimized machine-learning models 128 includes generating data samples 132 as a function of input data 106, determining a compatibility score 134 of a plurality of trained optimized machine-learning models 128*a-n* with the input data 106 using the data samples 132 and selecting the at least one optimized machine-learning models 128 as a function of the compatibility score 134 and plurality of attributes 118. In a non-limiting example, processor 102 may determine one optimized machine-learning models 128 from a plurality of trained optimized machine-learning models 128*a-n* that processes a specific attribute 118 of input data 106 and has a highest compatibility score 134.

With continued reference to FIG. 1, for the purposes of this disclosure, "data samples" are data that are representative of information that reflect similar characteristics, patterns, or distributions as input data. For the purposes of this disclosure, "data samples" are data that are representative of information reflecting similar characteristics, patterns, or distributions as the input data. In some embodiments, data samples 132 may be consistent with input data 106 so that data samples 132 are similar to input data 106 to test optimized machine-learning models 128. In a non-limiting example, data samples 132 may include anonymized patient records, averaged financial information of facilities, equipment usage statistics, historical admission and discharge data, or aggregated patient demographics. In some embodiments, processor 102 may retrieve data samples 132 from database 108 as a function of input data 106. As a non-limiting example, processor 102 may retrieve data samples 132 as a function of attributes 118 from database 108. In some embodiments, user may manually input data samples 132. In some embodiments, processor 102 may generate data samples 132 as a function of input data 106. As a non-limiting example, processor 102 may generate data samples 132 through the use of machine-learning models or without machine-learning models. For example, and without limitation, processor 102 may process input data 106, average the data and generate data samples 132. For example, and without limitation, processor 102 may generate data samples 132 using a sample machine-learning model trained with sample training data, wherein the sample training data may include correlations between exemplary input data and attributes correlated to exemplary data samples. Sample machine-learning model and sample training data may be consistent with any machine-learning models and training data described in this disclosure.

With continued reference to FIG. 1, for the purposes of this disclosure, a "compatibility score" is a metric that reflects how well each optimized machine-learning model performs on data samples. In a non-limiting example, compatibility score 134 may be an indicator of each optimized machine-learning model's suitability or effectiveness in handling specific characteristics (attributes 118) of input data 106. As a non-limiting example, compatibility score 134 may include a Boolean value. For example, and without limitation, compatibility score 134 may include yes/no, compatible/incompatible, and the like. As another non-limiting example, compatibility score 134 may be a quantitative characteristic, such as a numerical value within a set range. For example, a compatibility score may be a "2" for a set range of 1-10, where "1" represents data samples 132 with attribute 118 or input data with the attribute 118 and optimized machine-learning models 128*a-n* trained with a specific set of optimization training data 130*a-n* having a minimum compatibility and "10" represents data samples 132 with attribute 118 or input data with the attribute 118 and optimized machine-learning models 128*a-n* trained with a specific set of optimization training data 130*a-n* having a maximum compatibility. In other non-limiting embodiments, compatibility score 134 may be a quality characteristic, such as a color coding, where each color is associated with a level of compatibility. In one or more embodiments, if a compatibility score 134 is "low", then data samples 132 with attribute 118 or input data with the attribute 118 and optimized machine-learning models 128*a-n* trained with a specific set of optimization training data 130*a-n* are considered to have a minimum compatibility; if a compatibility score 134 is "high", then data samples 132 with attribute 118 or input data with the attribute 118 and optimized machine-learning models 128*a-n* trained with a specific set of optimization training data 130*a-n* are considered to have a maximum compatibility. In a non-limiting example, each trained optimized machine-learning models 128*a-n* may be tested on data samples 132; compatibility score 134 of optimized machine-learning models 128*a-n* may be based on performance metrics. For example, and without limitation, performance metrics may include accuracy, prediction error, processing speed, or other relevant criteria. Continuing the non-limiting example, optimized machine-learning models 128*a-n* that generate outputs closely aligned with expected outcomes for input data 106 may receive higher compatibility scores 134, indicating they are better suited for the task at hand. In some embodiments, user may manually input compatibility score 134. In some embodiments, processor 102 may retrieve compatibility score 134 from database 108. In some embodiments, processor 102 may determine compatibility score 134 using a fuzzy set system.

With continued reference to FIG. 1, in some embodiments, processor 102 may be configured to generate score training data 136. In a non-limiting example, score training data 136 may include correlations between exemplary input data or exemplary data samples and exemplary compatibility scores. In some embodiments, score training data 136 may be stored in database 108. In some embodiments, score training data 136 may be received from one or more users, database 108, external computing devices, and/or previous iterations of processing. As a non-limiting example, score training data 136 may include instructions from a user, who may be an expert user, a past user in embodiments disclosed herein, or the like, which may be stored in memory and/or stored in database 108, where the instructions may include labeling of training examples. In some embodiments, score training data 136 may be updated iteratively on a feedback loop. As a non-limiting example, processor 102 may update score training data 136 iteratively through a feedback loop as a function of input data 106, data samples 132, attributes 118, output of any machine-learning models described in this disclosure, or the like. In some embodiments, processor 102 may be configured to generate score machine-learning model 138. In a non-limiting example, generating score machine-learning model 138 may include training, retraining, or fine-tuning score machine-learning model 138 using score training data 136 or updated score training data 136. In some embodiments, processor 102 may be configured to determine compatibility score 134 using score machine-learning model 138 (i.e. trained or updated score machine-learning model 138). In some embodiments, generating training data and training machine-learning models may be simultaneous.

With continued reference to FIG. 1, in some embodiments, processor 102 may be configured to generate classification training data 140. In a non-limiting example, classification training data 140 may include exemplary attributes correlated to exemplary attribute labels. In some embodiments, classification training data 140 may be stored in database 108. In some embodiments, classification training data 140 may be received from one or more users, database 108, external computing devices, and/or previous iterations of processing. As a non-limiting example, classification training data 140 may include instructions from a user, who may be an expert user, a past user in embodiments disclosed herein, or the like, which may be stored in memory and/or stored in database 108, where the instructions may include labeling of training examples. In some embodiments, classification training data 140 may be updated iteratively on a feedback loop. As a non-limiting example, processor 102 may update classification training data 140 iteratively through a feedback loop as a function of input data 106, attribute 118, output of any machine-learning models in this disclosure, or the like. In some embodiments, processor 102 may be configured to generate attribute classifier 142. In a non-limiting example, generating attribute classifier 142 may include training, retraining, or fine-tuning attribute classifier 142 using classification training data 140 or updated classification training data 140. In some embodiments, processor 102 may be configured to classify a plurality of attributes 118 to one or more attribute labels 144 using attribute classifier 142 (i.e. trained or updated attribute classifier 142). As used in the current disclosure, an "attribute label" is a term or set of terms assigned to an attribute of input data. As a non-limiting example, attribute label 144 may include operation cost, insurance price, patient traffic, equipment usage, and the like. As another non-limiting example, attribute label 144 may include a label of type of data. The persons skilled in the art, upon reviewing the entirety of this disclosure, may appreciate various attribute labels 144 that can be used for apparatus 100. In some embodiments, processor 102 may select at least one optimized machine-learning models 128 as a function of one or more attribute labels 144.

With continued reference to FIG. 1, in some embodiments, plurality of optimized machine-learning models 128*a-n* may include a recurrent neural network (RNN) 146. In some embodiments, plurality of optimized machine-learning models 128*a-n* may include linear temporal models, and the like. For the purposes of this disclosure, "recurrent neural network" is a neural network designed for processing sequential data, where the order and context of previous inputs affect current outputs. RNNs 146 may be used for tasks that involve time-series data, natural language processing, and any data with a temporal or ordered structure, as they "remember" previous inputs within the sequence to inform future predictions. In a non-limiting example, RNN 146 may handle sequential data that requires context over time; for instance, tracking a patient's vital signs over hours or days (input data 106). For the purposes of this disclosure, "linear temporal model" is mathematical models that assume a linear relationship between time-based data points. Linear temporal model may be used in time-series analysis, where linear temporal model can predict future data points (e.g., output data 148) based on past values (e.g., input data 106). As a non-limiting example, linear temporal models may include autoregressive (AR) models, moving average (MA) models, and autoregressive integrated moving average (ARIMA) models. In a non-limiting example, linear temporal models may be used for straightforward time-dependent patterns, such as forecasting patient admission rates (e.g., output data 148) based on historical data (e.g., input data 106).

With continued reference to FIG. 1, in some embodiments, optimized machine-learning module 126 may include at least two optimized machine-learning models 128 that are arranged in parallel. In some embodiments, in a parallel arrangement, multiple optimized machine-learning models 128*a-n* may operate simultaneously, each processing input data 106 independently to produce separate output data 148. In some embodiments, outputs from at least two optimized machine-learning models 128 that are arranged in parallel can then be combined, averaged, or voted upon to yield a final result (output data 148). For example, and without limitation, first optimized machine-learning models 128 may be a time-series model that projects operating costs (output data 148) based on historical cost data (input data 106) and second optimized machine-learning models 128 may be a regression model trained to incorporate external factors, such as inflation rates and local economic indicators, that may impact costs (output data 148). In a non-limiting example, each model independently may predict the monthly operating cost, and processor 102 may then average the outputs to produce a final forecast (output data 148). In a non-limiting example, first optimized machine-learning models 128 may generate projections related to facility's finance while second optimized machine-learning models 128 may generate projections related facility's equipment usage.

With continued reference to FIG. 1, in some embodiments, an optimized machine-learning module 126 may include at least two optimized machine-learning models 128 that are arranged in series. In some embodiments, at least two optimized machine-learning models 128 that are arranged in series may be arranged in a sequence where an output of one model serves as an input for the next model. This chaining of models may allow for progressive processing, where each model refines, transforms, or builds upon the output of the previous model, often to generate a more complex or processed final result (output data 148). For example, an without limitation, first optimized machine-learning models 128 may be a scheduling model that analyzes historical usage data (input data XX) for each piece of equipment (e.g., MRI machines, CT scanners) and identifies high-demand periods. The scheduling model's output may be then fed into second optimized machine-learning models 128, a predictive model that estimates equipment demand for upcoming weeks based on anticipated patient volume, seasonality, and peak times. This series arrangement may allow the hospital to develop a precise schedule that not only reflects historical patterns but also anticipates future demand, helping to maximize equipment availability and minimize wait times.

With continued reference to FIG. 1, in some embodiments, optimized machine-learning module 126 may include at least two parallel model sets, wherein each of the at least two parallel model sets may include at least two optimized machine-learning models 128 that are arranged in series and the at least two parallel model sets may be associated with one attribute label 144 of a plurality of attribute labels 144. This is further described in detail with respect to FIG. 3. In some embodiments, each parallel model set may be tailored to handle a specific attribute label 144, allowing processor 102 to simultaneously process input data 106 according to different attributes 118 while performing complex, sequential processing within each set. In some embodiments, selecting at least one optimized machine-learning models 128 may include assigning a weight 150 to an output of each of the at least two parallel model sets and determining one parallel model set from the at least two parallel model sets as a function of the weight 150. In a non-limiting example, after each model set generates an output, processor 102 may assign a weight 150 to the output. As a non-limiting example, processor 102 may assign weight 150 using various factors, such as accuracy or relevance of the output (how well the model's output aligns with expected outcomes or the data's characteristics, resource efficiency (e.g., how computationally intensive the model set is, or how much bandwidth or processing power it requires), speed or latency (e.g., how quickly the model set produces results, which might be crucial if the application needs rapid response times), and the like. Continuing the non-limiting example, by assigning weights 150, processor 102 may prioritize or select certain model sets based on these performance factors, creating a comparative metric for each model set and ranking or scoring each model set based on how well it meets the criteria defined by these weights 150.

With continued reference to FIG. 1, memory 104 contains instructions configuring processor 102 to generate output data 148 as a function of input data 106 and plurality of attributes 118 using a selected optimized machine-learning models 128. For the purposes of this disclosure, "output data" is data describing a future trend pertaining to input data. Output data 148 may be based on data collected in the past (i.e., historical data) and generated using mathematical tools such as extrapolation or the like. As a non-limiting example, output data 148 may include financial projections, usage projections, demand projections, and the like. In one or more embodiment, in order to obtain output data 148, apparatus 100 may implement one or more algorithms to retrieve and analyze input data 106. In one or more embodiments, output data 148 may be retrieved from or supplied by a third party, such as without limitation by querying a database or the like independent from but accessible to apparatus 100. Output data 148 may describe or pertain to any suitable or reasonable period of time into the future, such as without limitation one week, two weeks, one month, three months, six months, one year, two years, or the like. In some embodiments, processor 102 may retrieve output data 148 from database 108. In some embodiments, user may manually input output data 148.

With continued reference to FIG. 1, in one or more embodiments, when apparatus 100 is deployed for a facility, such as without limitation a behavior care center, output data 148 may include a projected level of occupancy. For the purposes of this disclosure, a "level of occupancy" is an indication describing the degree to which a facility is utilized, occupied, accessed, or otherwise unavailable. In some cases, a level of occupancy may include a numerical indication, such as without limitation a percentage at which a facility is being utilized. As a nonlimiting example, a high percentage, e.g., 95%, may be used to indicate that a hospital is nearly full during the peak of flu season. In some other cases, a level of occupancy may include a descriptive or categorical indication, such as without limitation "over capacity", "full", "nearly full", "half full", "nearly empty", "empty", or the like.

With continued reference to FIG. 1, additionally, and/or alternatively, in one or more embodiments, when apparatus 100 is deployed for a facility, such as without limitation a healthcare facility, output data 148 may include one or more numerical characteristics, such as without limitation a projected number of visitors or visits per day, week, month, or year. In one or more embodiments, output data 148 may include time-correlated data that capture the rise, fall, plateau, etc. of input data 106 over time. As a nonlimiting example, output data 148 may include predictive information pertaining to the traffic at a healthcare facility, such as without an anticipated number of patients ort visitors, an anticipated number of appointments, sessions, treatments, surgical procedures, or operations, an anticipated level of occupancy, etc., over the course or a week, month, quarter, year, or the like; such traffic may in some cases have periodic or cyclic patterns, such as without limitation as a function of seasonal changes (e.g., flu seasons during winter time), shifts in demography (e.g., break between semesters in a college town), and/or the like. As another nonlimiting example, output data 148 may describe the upside potential, user needs, and/or financial projection (cost, revenue, etc.) of a facility, such as without limitation a hospital, clinic, or one or more departments or units therein, among others.

With continued reference to FIG. 1, in some embodiments, generating output data 148 may include generating a user interface 120 displaying output data 148 on a user device 110. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, user interface 120 may include an interactive graphical user interface 152. For the purposes of this disclosure, an "interactive graphical user interface" is an interface that facilitates engagement between a user and a system through graphical elements. As a non-limiting example, an interactive GUI 152 may include graphical elements such as buttons, icons, menus, sliders, or forms, which users can interact with to receive data, input data, modify displayed data, or initiate actions. In some embodiments, an interactive GUI 152 may enable data entry or selection activities. For instance, and without limitation, a user may allow to interact with graphical elements of interactive GUI 152. In some embodiments, interactive GUI 152 may be stored in a database 108, and a processor 102 may retrieve the interactive GUI 152 from the database 108. In some embodiments, users may manually customize or configure interactive GUI 152. Additional disclosure related to interactive graphical user interface 152 may be found in U.S. Nonprovisional patent application Ser. No. 18/958,334, filed on Nov. 25, 2024, and titled "APPARATUS AND METHOD FOR GENERATING AN INTERACTIVE GRAPHICAL USER INTERACE," the entirety of which is incorporated as a reference.

With continued reference to FIG. 1, in some embodiments, training each of plurality of optimized machine-learning models 128*a-n* may include receiving a user input 154 as a function of displayed output data 148 from user interface 120 or interactive graphical user interface 152, updating a plurality of sets of optimization training data 130 as a function of the user input 154 and retraining each of the plurality of optimized machine-learning models 128*a-n* using the plurality of sets of updated optimization training data 130. For the purposes of this disclosure, a "user input" is any data input by a user through a user interface. As a non-limiting example, user input 154 may include user's feedback related to projections (output data 148). For example, and without limitation, user input 154 may include feedback that a user accepts or rejects output data 148. For example, and without limitation, user input 154 may include user's modification of output data 148. In some embodiments, updating plurality of sets of optimization training data 130 as a function of user input 154 may include adding, modifying or deleting correlations of exemplary user input and exemplary output data as a function of user input 154.

With continued reference to FIG. 1, processor 102 may be configured to update optimization training data 130 of optimized machine-learning models 128*a-n* using user input 154*s*. Optimized machine-learning models 128*a-n* may use user input 154 to update its training data, thereby improving its performance, speed, and accuracy. In embodiments, optimized machine-learning models 128*a-n* may be iteratively updated using input and output results of past iterations of optimized machine-learning models 128*a-n*. Optimized machine-learning models 128*a-n* may then be iteratively retrained using the updated optimization training data 130. For instance, and without limitation, optimized machine-learning models 128*a-n* may be trained using a first training data from, for example, and without limitation, training data from a user input 154 or database. Optimized machine-learning models 128*a-n* may then be updated by using previous inputs and outputs from optimized machine-learning models 128*a-n* as second set of training data to then retrain a newer iteration of optimized machine-learning models 128*a-n*. This process of updating optimized machine-learning models 128*a-n* and its associated training data may be continuously done to create subsequent optimized machine-learning models 128*a-n* to improve the speed and accuracy of optimized machine-learning models 128*a-n*. When users interact with the software, their actions, preferences, and feedback provide valuable information that can be used to refine and enhance the model. This user input 154 may be collected and incorporated into the training data, allowing the machine learning model to learn from real-world interactions and adapt its predictions accordingly. By continually incorporating user input 154, the model becomes more responsive to user needs and preferences, capturing evolving trends and patterns. This iterative process of updating the training data with user input 154 enables the machine learning model to deliver more personalized and relevant results, ultimately enhancing the overall user experience. The discussion within this paragraph may apply to both optimized machine-learning models 128*a-n* and any other machine-learning model/classifier discussed herein.

With continued reference to FIG. 1, incorporating user input 154 may include updating training data (e.g., optimization training data 130) by removing or adding correlations of input data and output data to a path or resources as indicated by user input 154. Any machine-learning model (e.g., optimized machine-learning models 128*a-n*) as described herein may have the training data updated based on such feedback or data gathered using any method described herein. For example, when correlations in training data are based on outdated information, a web crawler may update such correlations based on more recent resources and information.

With continued reference to FIG. 1, processor 102 may use user input 154 to train machine-learning models and/or classifiers described above. For example, machine-learning models and/or classifiers may be trained using past inputs and outputs of the machine-learning model. In some embodiments, if user input 154 indicates that an output of machine-learning models and/or classifiers was "unfavorable," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, machine-learning models may be retrained with modified training data as described in further detail below. In some embodiments, training data of classifier may include user input 154.

Figure 2:
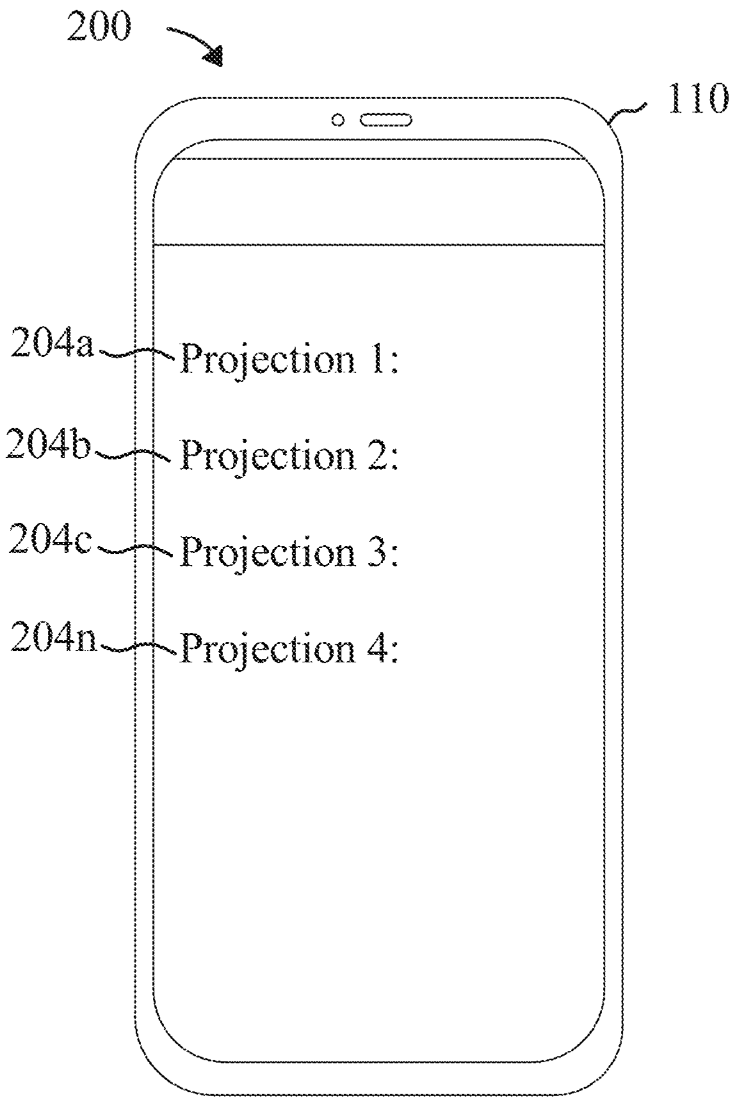
FIG. 2 illustrates an exemplary user interface displaying output data on a user device.

Referring now to FIG. 2, an exemplary user interface 200 displaying output data 148 on a user device 110 is illustrated. The user interface 200 may be consistent with user interface 120. In some embodiments, user interface 200 may display a plurality of projections 204*a-n* related to financial projections, usage projections, demand projections, and the like. For example, and without limitation, plurality of projections 204*a-n* may include a projected number of visitors or visits per day, week, month, or year. For example, and without limitation, plurality of projections 204*a-n* may include a projected level of occupancy.

Figure 3:
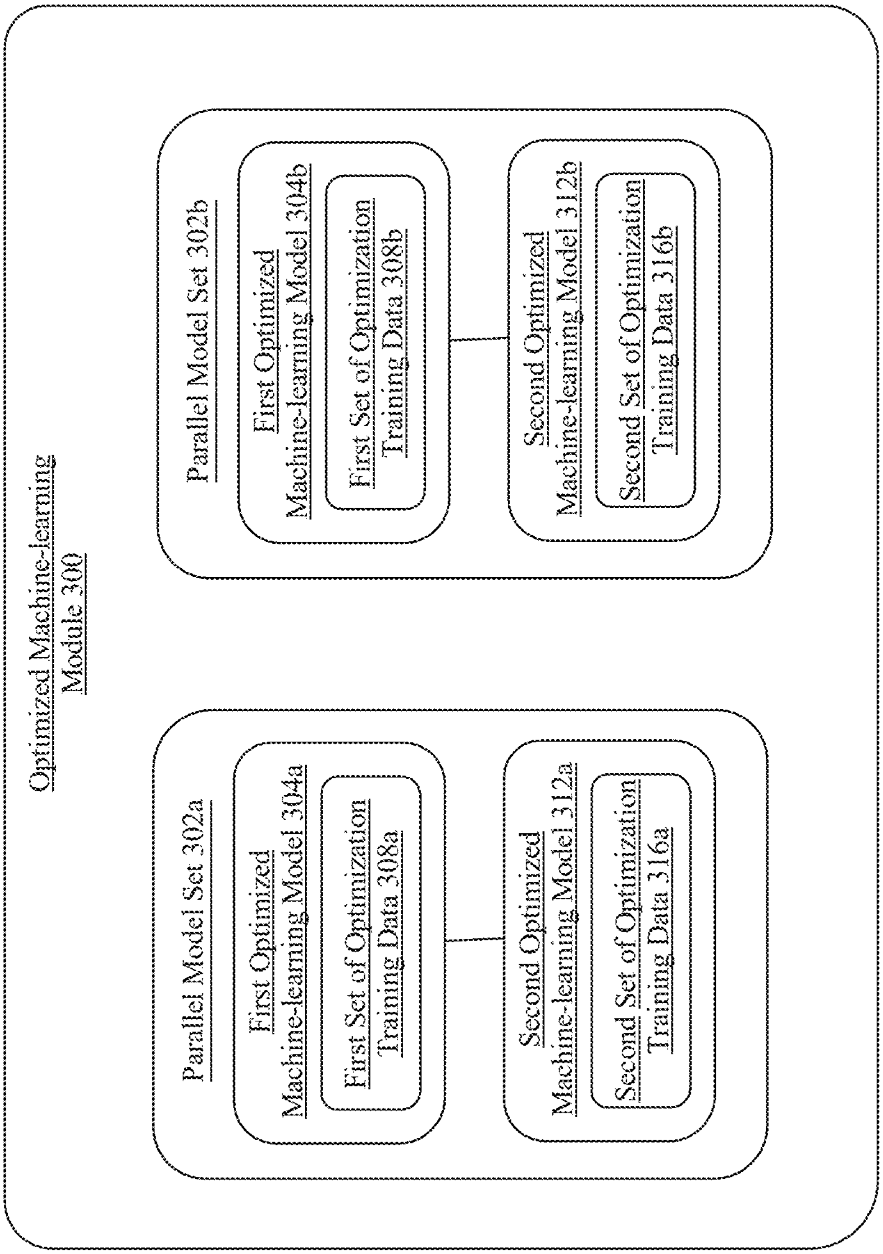
FIG. 3 illustrates an exemplary optimized machine-learning module.

Referring now to FIG. 3, a block diagram of an exemplary optimized machine-learning module 300 including a plurality of optimized machine-learning models 128*a-n* is illustrated. The optimized machine-learning module 300 may be consistent with optimized machine-learning module 300. In some embodiments, optimized machine-learning module 300 may include at least two parallel model sets, wherein each of the at least two parallel model sets may include at least two optimized machine-learning models 128 that are arranged in series and the at least two parallel model sets may be associated with one attribute label 144 of a plurality of attribute labels 144. In a non-limiting example, parallel model sets 302 may be associated with an attribute label 144 'budget' and within this set and two parallel model sets 302, both designed to produce financial forecasts for attribute label 'budget.' Each parallel model set 302 may use different types of optimized machine-learning models 128*a-n* with varying resource requirements, processing speeds, and capabilities. By assigning weights 150 based on forecast accuracy and model performance requirements, processor 102 may determine which parallel model set 302 is optimal under the current conditions. For example, and without limitation, parallel model set 302*a* may include optimized machine-learning models 128*a-b* that require significant computational resources but provide highly accurate forecasts by processing large amounts of data (input data 106). Continuing the non-limiting example, first optimized machine-learning model 304*a* that is trained with first set of optimization training data 308*a* may include a deep learning model that analyzes detailed historical and current financial data (input data 106), including multiple input variables like supply costs, staffing expenses, and revenue streams. The output from first optimized machine-learning model 304*a* may be fed to second optimized machine-learning models 312*a* that is trained with second set of optimization training data 316*a*, a model that may refine predictions by considering external economic factors, such as regional cost-of-living adjustments and inflation trends. Parallel model set 302*a* may have high computational demands and a longer processing time. Processor 102 may assign a weight of 0.7 when a facility has sufficient bandwidth and capacity to accommodate it, as its output is typically more precise. Continuing the non-limiting example, parallel model set 302*b* may be designed for faster processing and lower resource usage, utilizing simpler models that sacrifice some accuracy for speed and efficiency. First optimized machine-learning models 304*b* that is trained with first set of optimization training data 308*b* may include a linear regression model that uses core budget factors (input data 106) such as patient volume and average expense per patient to make quick forecasts. The output from first optimized machine-learning models 304*b* may be passed to second optimized machine-learning model 312*b* that is trained with second set of optimization training data 316*b*, a basic statistical model that applies real-time adjustments based on current patient census and immediate resource availability (input data 106). Parallel model set 302*b* may include lower computational requirements and can provide results quickly, making it suitable for scenarios where bandwidth or processing capacity is limited. In some embodiments, processor 102 may assign a weight of 0.3 under standard operating conditions but may be prioritized (given a higher weight) if the system needs faster outputs due to bandwidth constraints. Continuing the non-limiting example, processor 102 may evaluate the weighted outputs of each parallel model set 302*a-b* based on current operational conditions: for instance, if there is ample processing power and response time is not critical, parallel model set 302*a* (the high-capacity set) may be selected due to its higher weight of 0.7 and superior accuracy and conversely, if bandwidth or computational resources are limited or there's a need for a quick response (e.g., during high-demand periods), parallel model set 302*b* (the low-latency set) may be prioritized, as it can produce forecasts more quickly with minimal resource usage.

With continued reference to FIG. 3, in a non-limiting example, optimized machine-learning module 300 may include two parallel model sets 302*a-b*, each designed to generate financial projections (output data 148) for attribute label 'budget forecasting.' Each parallel model sets 302*a-b* may include a series of optimized machine-learning models 128*a-n* that use distinct methodologies to achieve the same goal of accurately forecasting financial needs. Parallel model set 302*a* may generate financial forecasts (output data 148) based heavily on historical expense trends and patterns (input data 106). First optimized machine-learning model 304*a* that is trained with first set of optimization training data 130*b* may perform an initial time-series analysis using past monthly expenses to detect seasonal and long-term spending patterns (input data 106). The output from first optimized machine-learning model 304*a* may be fed into second optimized machine-learning models 312*a*, which refines the forecast by adjusting for inflation rates and recent cost increases in medical supplies and staffing. In some embodiments, processor 102 may assign parallel model set 302*a* a weight of 0.4, reflecting its reliance on stable historical data, which may be less responsive to recent operational changes. Continuing the non-limiting example, parallel model set 302*b* may use recent operational metrics (e.g., patient volume fluctuations, recent equipment purchases, and staff overtime hours; input data 106) to make real-time adjustments to budget projections. The use of first optimized machine-learning models 304*b* may begin by analyzing recent changes in patient volume and shifts in operational costs. The output from first optimized machine-learning models 304*b* may be passed to second optimized machine-learning model 312*b* that is trained with second set of optimization training data 130*b*, which adjusts projections based on anticipated increases in demand for specific departments, accounting for both historical and current trends. This parallel model set 302*b* may receive a weight of 0.6, as it incorporates recent data, which may improve responsiveness to current and anticipated financial needs. Continuing the non-limiting example, each parallel model set 302*a-b* may generate a budget forecast (output data 148), but processor 102 may assign a higher weight (0.6) to parallel model set 302*b*, as it includes recent operational data that may provide a more accurate short-term forecast. The processor 102 may then evaluate the weighted outputs from both parallel model sets 302*a-b*, ultimately selecting parallel model set 302*b* as the preferred or selected model set due to its higher compatibility with a facility's current budget needs.

Figure 4:
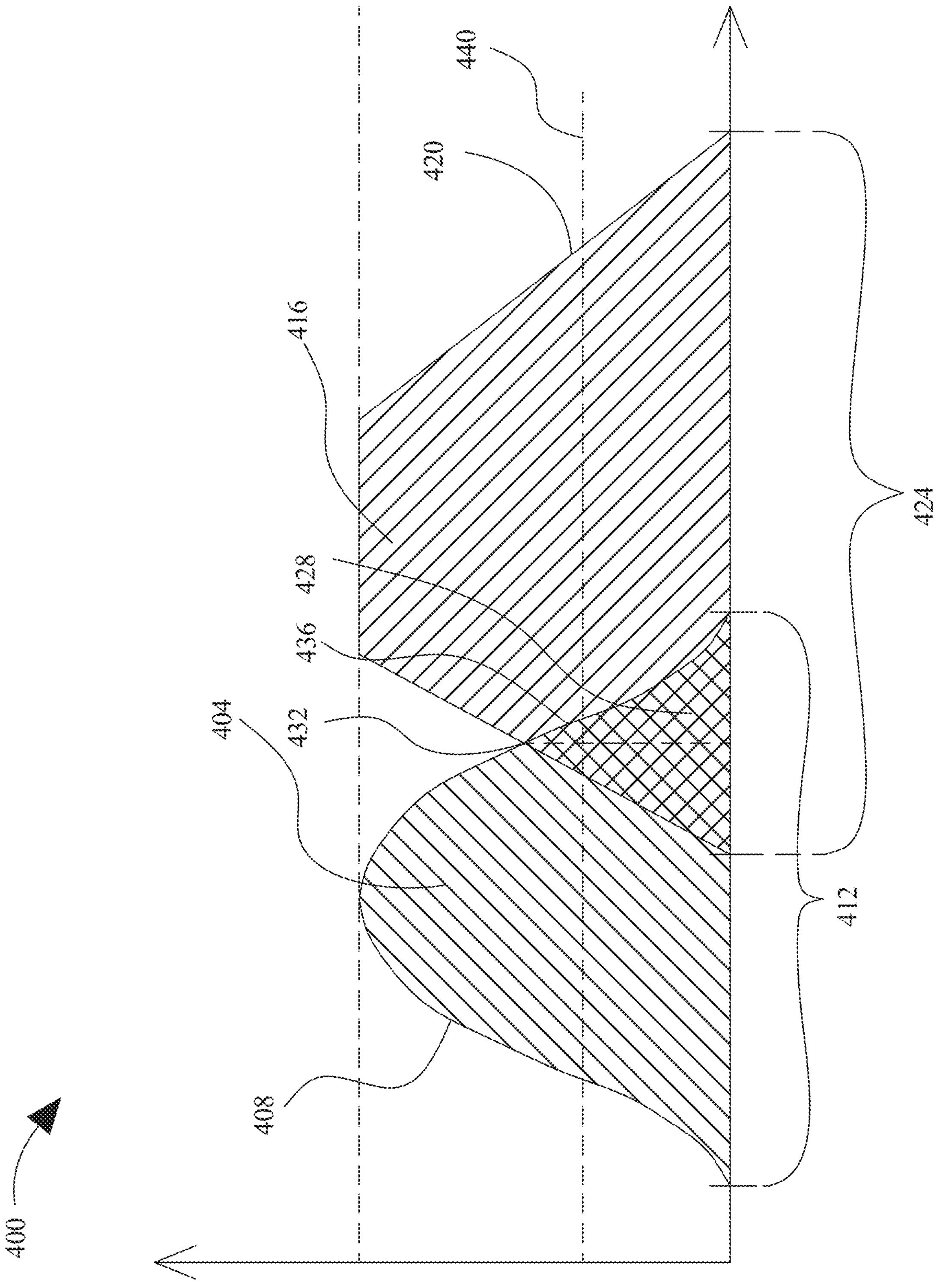
FIG. 4 illustrates an exemplary fuzzy set system.

Referring to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 4, first fuzzy set 404 may represent any value or combination of values as described above, including output from one or more machine-learning models, input data 106, attribute 118 and/or data samples 132, and a predetermined class, such as without limitation of compatibility score 134. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between an output from one or more machine-learning models and/or input data 106, attribute 118 and/or data samples 132 and a predetermined class, such as without limitation compatibility score categorization, for combination to occur as described above. Alternatively or additionally, each threshold may be tuned by a machine-learning and/or statistical process, for instance and without limitation as described in further detail below.

Further referring to FIG. 4, in an embodiment, a degree of match between fuzzy sets may be used to classify input data 106, attribute 118 and/or data samples 132 with compatibility score 134. For instance, if a compatibility score 134 has a fuzzy set matching input data 106, attribute 118 and/or data samples 132 fuzzy set by having a degree of overlap exceeding a threshold, processor 102 may classify the input data 106, attribute 118 and/or data samples 132 as belonging to the compatibility score categorization. Where multiple fuzzy matches are performed, degrees of match for each respective fuzzy set may be computed and aggregated through, for instance, addition, averaging, or the like, to determine an overall degree of match.

Still referring to FIG. 4, in an embodiment, input data 106, attribute 118 and/or data samples 132 may be compared to multiple compatibility score categorization fuzzy sets. For instance, input data 106, attribute 118 and/or data samples 132 may be represented by a fuzzy set that is compared to each of the multiple compatibility score categorization fuzzy sets; and a degree of overlap exceeding a threshold between the input data 106, attribute 118 and/or data samples 132 fuzzy set and any of the multiple compatibility score categorization fuzzy sets may cause processor 102 to classify the input data 106, attribute 118 and/or data samples 132 as belonging to compatibility score categorization. For instance, in one embodiment there may be two compatibility score categorization fuzzy sets, representing respectively compatible categorization and incompatible categorization. First compatibility score categorization may have a first fuzzy set; Second compatibility score categorization may have a second fuzzy set; and input data 106, attribute 118 and/or data samples 132 may have input data 106, attribute 118 and/or data samples 132 fuzzy set. Processor 102, for example, may compare input data 106, attribute 118 and/or data samples 132 fuzzy set with each of compatibility score categorization fuzzy set and incompatibility score categorization fuzzy set, as described above, and classify input data 106, attribute 118 and/or data samples 132 to either, both, or neither of compatibility score categorization or incompatibility score categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, input data 106, attribute 118 and/or data samples 132 may be used indirectly to determine a fuzzy set, as input data 106, attribute 118 and/or data samples 132 fuzzy set may be derived from outputs of one or more machine-learning models that take the input data 106, attribute 118 and/or data samples 132 directly or indirectly as inputs.

Still referring to FIG. 4, a computing device may use a logic comparison program, such as, but not limited to, a fuzzy logic model to determine a compatibility score 134 response. An compatibility score 134 response may include, but is not limited to, compatible, incompatible, and the like; each such compatibility score 134 response may be represented as a value for a linguistic variable representing compatibility score 134 response or in other words a fuzzy set as described above that corresponds to a degree of compatibility as calculated using any statistical, machine-learning, or other method that may occur to a person skilled in the art upon reviewing the entirety of this disclosure. In other words, a given element of input data 106, attribute 118 and/or data samples 132 may have a first non-zero value for membership in a first linguistic variable value such as "compatible" and a second non-zero value for membership in a second linguistic variable value such as "incompatible." In some embodiments, determining a compatibility score categorization may include using a linear regression model. A linear regression model may include a machine learning model. A linear regression model may be configured to map data of input data 106, attribute 118 and/or data samples 132, such as degree of compatibility to one or more compatibility score 134 parameters. A linear regression model may be trained using a machine learning process. A linear regression model may map statistics such as, but not limited to, quality of input data 106, attribute 118 and/or data samples 132 compatibility. In some embodiments, determining a compatibility score 134 of input data 106, attribute 118 and/or data samples 132 may include using a compatibility score 134 classification model. A compatibility score 134 classification model may be configured to input collected data and cluster data to a centroid based on, but not limited to, frequency of appearance, linguistic indicators of quality, and the like. Centroids may include scores assigned to them such that quality of compatibility of input data 106, attribute 118 and/or data samples 132 may each be assigned a score. In some embodiments compatibility score 134 classification model may include a K-means clustering model. In some embodiments, compatibility score 134 classification model may include a particle swarm optimization model. In some embodiments, determining the compatibility score 134 of input data 106, attribute 118 and/or data samples 132 may include using a fuzzy inference engine. A fuzzy inference engine may be configured to map one or more input data 106, attribute 118 and/or data samples 132 data elements using fuzzy logic. In some embodiments, input data 106, attribute 118 and/or data samples 132 may be arranged by a logic comparison program into compatibility score 134 arrangement. An "compatibility score 134 arrangement" as used in this disclosure is any grouping of objects and/or data based on skill level and/or output score. This step may be implemented as described above in FIGS. 1-3. Membership function coefficients and/or constants as described above may be tuned according to classification and/or clustering algorithms. For instance, and without limitation, a clustering algorithm may determine a Gaussian or other distribution of questions about a centroid corresponding to a given compatibility level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 4, an inference engine may be implemented according to input and/or output membership functions and/or linguistic variables. For instance, a first linguistic variable may represent a first measurable value pertaining to input data 106, attribute 118 and/or data samples 132, such as a degree of compatibility of an element, while a second membership function may indicate a degree of in compatibility score 134 of a subject thereof, or another measurable value pertaining to input data 106, attribute 118 and/or data samples 132. Continuing the example, an output linguistic variable may represent, without limitation, a score value. An inference engine may combine rules, the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b-a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Arca defuzzification, or the like. Alternatively or additionally, output rules may be replaced with functions according to the Takagi-Sugeno-King (TSK) fuzzy model.

Further referring to FIG. 4, input data 106, attribute 118 and/or data samples 132 to be used may be selected by user selection, and/or by selection of a distribution of output scores, such as 40% compatible, 40% moderate, and 40% incompatible, or the like. Each compatibility score categorization may be selected using an additional function such as incompatibility score 134 as described above.

Figure 5:
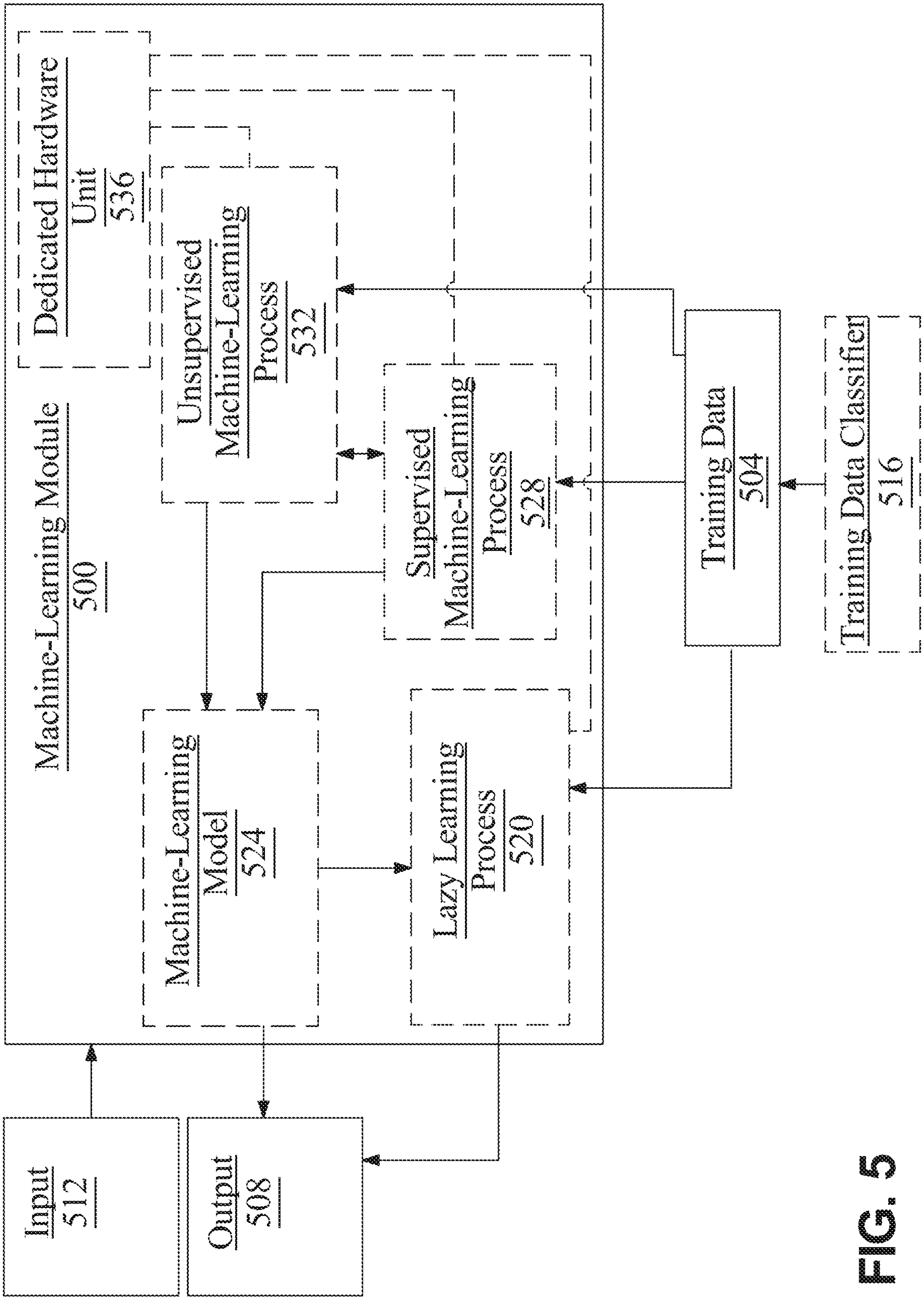
FIG. 5 illustrates a block diagram of an exemplary machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, input data of training data 504 used by machine-learning module 500 may include input data 106, attribute 118, attribute label 144, data samples 132, compatibility score 134, user input 154, hierarchical data structure 112, hierarchical groups 114, and the like. As a non-limiting illustrative example, output data of training data 504 used by machine-learning module 500 may include attribute 118, attribute label 144, data samples 132, compatibility score 134, hierarchical data structure 112, hierarchical groups 114, output data 148, and the like.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to facility cohort, such as facility's industry, field, size, location, goal, and the like.

Still referring to FIG. 5, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute $l$ as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data 106, attribute 118, attribute label 144, data samples 132, compatibility score 134, user input 154, hierarchical data structure 112, hierarchical groups 114, and the like as described above as inputs, attribute 118, attribute label 144, data samples 132, compatibility score 134, hierarchical data structure 112, hierarchical groups 114, output data 148, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task clastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
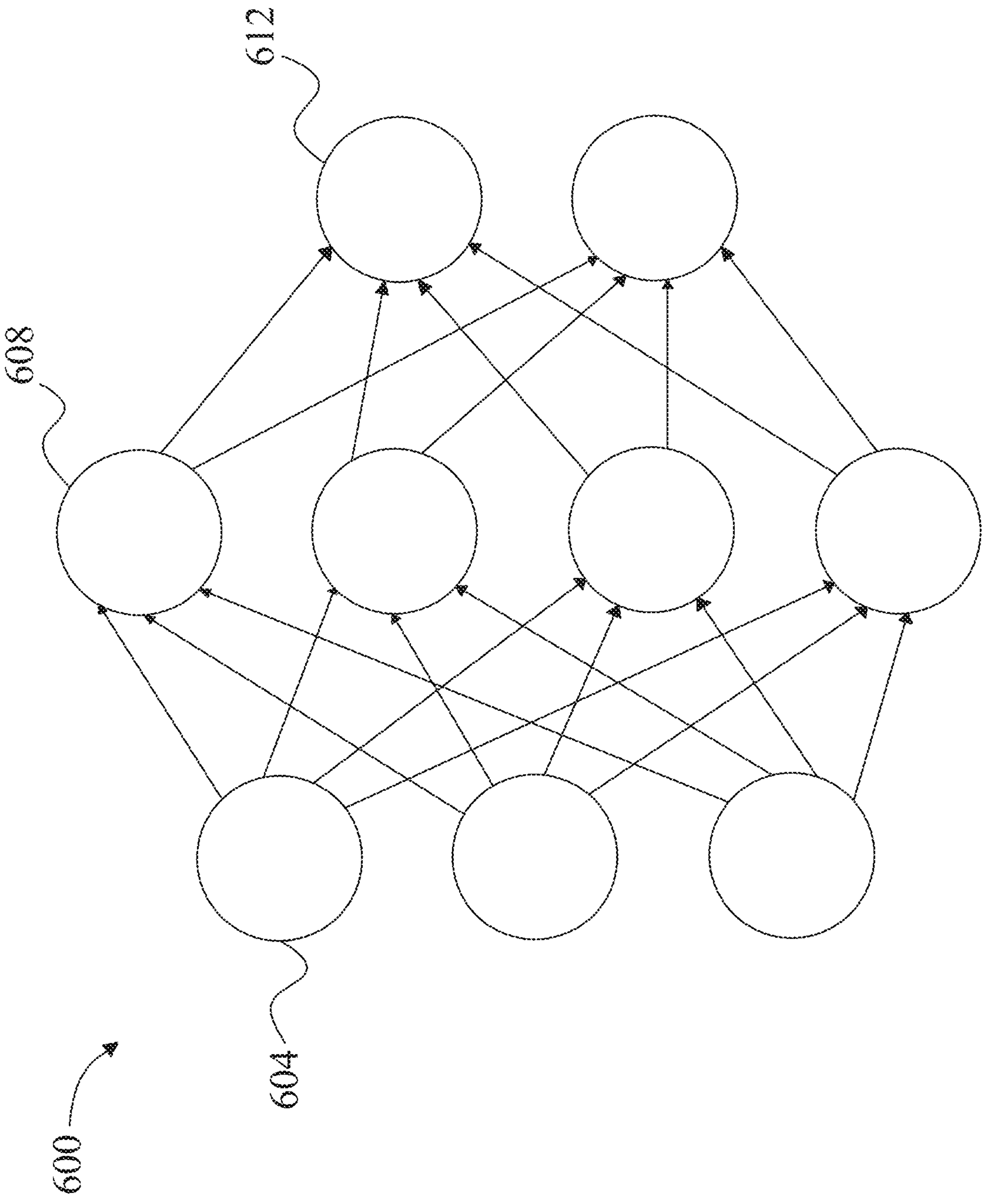
FIG. 6 illustrates a diagram of an exemplary neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
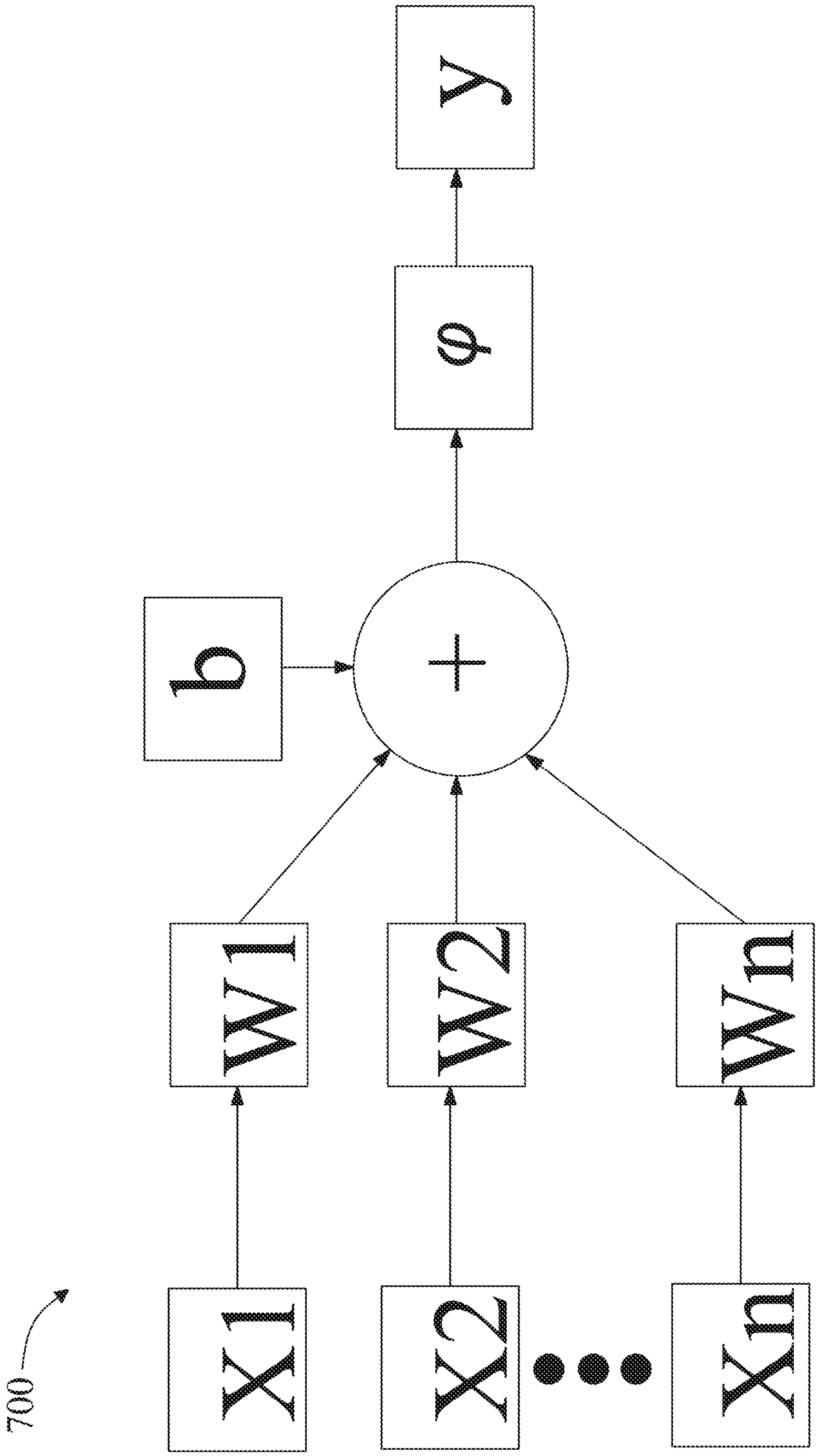
FIG. 7 illustrates a block diagram of an exemplary node in a neural network.

Referring now to FIG. 7, an exemplary embodiment of a node 700 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some $\alpha$, an exponential $$f(x) = \begin{cases} x & \text{for } x \geq 0 \\ \alpha(e^x - 1) & \text{for } x < 0 \end{cases}$$

for some value of $\alpha$ (this function linear units function such as may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda\begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
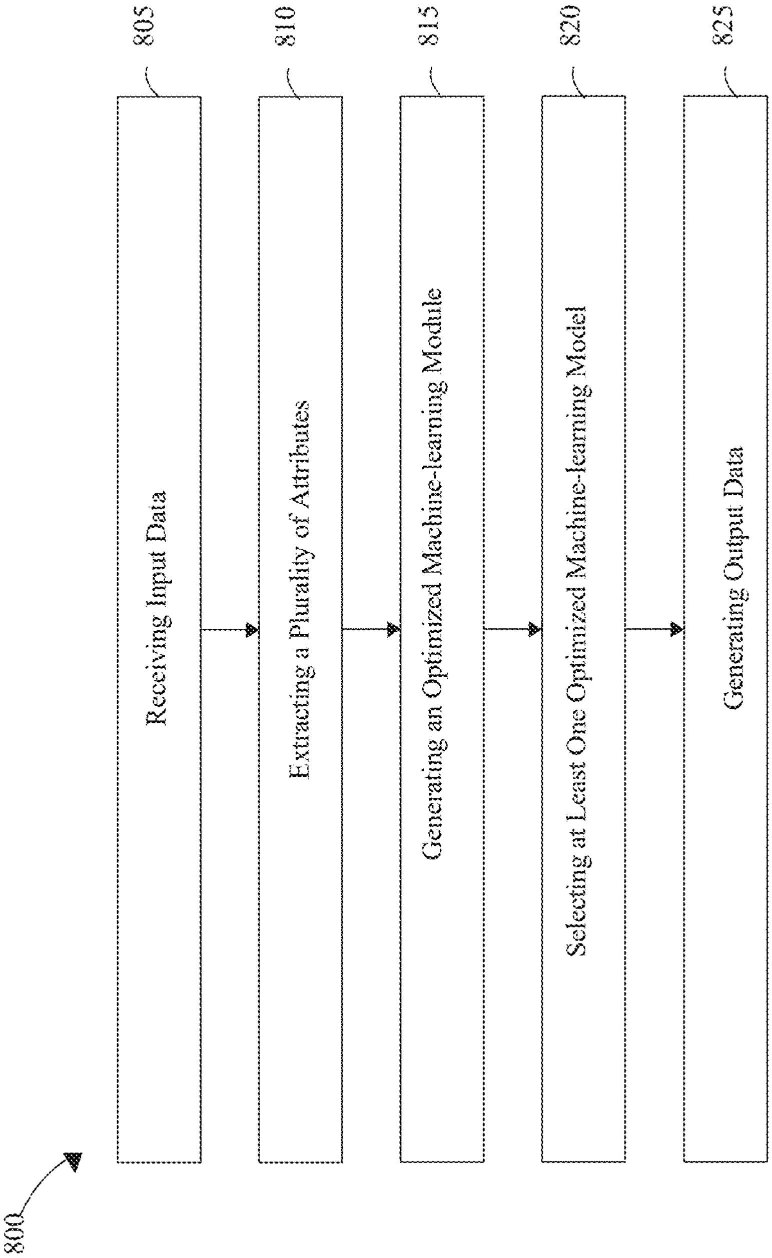
FIG. 8 illustrates a flow diagram of an exemplary method for machine-learning model optimization for data attributes.

Referring now to FIG. 8, a flow diagram of an exemplary method 800 for machine-learning model optimization for data attributes is disclosed. Method 800 contains a step 805 of receiving, using at least a processor, input data. In some embodiments, receiving the input data may include receiving the input data from a database including a hierarchical data structure correlated to one or more hierarchical groups generated by a group classifier. These may be implemented as reference to FIGS. 1-7.

With continued reference to FIG. 8, method 800 contains a step 810 of extracting, using at least a processor, a plurality of attributes from input data. This may be implemented as reference to FIGS. 1-7.

With continued reference to FIG. 8, method 800 contains a step 815 of generating, using at least a processor, an optimized machine-learning module including a plurality of optimized machine-learning models, wherein generating the optimized machine-learning module includes generating a plurality of sets of optimization training data, wherein each set of the plurality of sets of optimization training data includes exemplary input data with different attributes correlated to exemplary output data and training each of the plurality of optimized machine-learning models using each of the plurality of sets of optimization training data. In some embodiments, the plurality of optimized machine-learning models may include a recurrent neural network. In some embodiments, the optimized machine-learning module may include at least two optimized machine-learning models that are arranged in parallel. In some embodiments, the optimized machine-learning module may include at least two optimized machine-learning models that are arranged in series. In some embodiments, the optimized machine-learning module may include at least two parallel model sets, wherein each of the at least two parallel model sets comprises at least two optimized machine-learning models that are arranged in series and the at least two parallel model sets are associated with one attribute label of a plurality of attribute labels. In some embodiments, selecting the at least one optimized machine-learning model may include assigning a weight to an output of each of the at least two parallel model sets and determining one parallel model set from the at least two parallel model sets as a function of the weight. These may be implemented as reference to FIGS. 1-7.

With continued reference to FIG. 8, method 800 contains a step 820 of selecting, using at least a processor, at least one optimized machine-learning model from a plurality of trained optimized machine-learning models as a function of a plurality of attributes, wherein selecting the at least one optimized machine-learning model includes generating data samples as a function of input data, determining a compatibility score of the plurality of trained optimized machine-learning model with the input data using the data samples and selecting the at least one optimized machine-learning model as a function of the compatibility score and the plurality of attributes. In some embodiments, selecting the at least one optimized machine-learning model may include generating classification training data, wherein the classification training data comprises exemplary attributes correlated to exemplary attribute labels, training an attribute classifier using the classification training data, classifying the plurality of attributes to one or more attribute labels and selecting the at least one optimized machine-learning model as a function of the one or more attribute labels. These may be implemented as reference to FIGS. 1-7.

With continued reference to FIG. 8, method 800 contains a step 825 of generating, using at least a processor, output data as a function of input data and a plurality of attributes using a selected optimized machine-learning model. In some embodiments, generating the output data may include generating a user interface displaying the output data on a user device, wherein the user interface may include an interactive graphical user interface. In some embodiments, training each of the plurality of optimized machine-learning models may include receiving a user input as a function of the displayed output data from the interactive graphical user interface, updating the plurality of sets of optimization training data as a function of the user input and retraining each of the plurality of optimized machine-learning models using the plurality of sets of updated optimization training data. These may be implemented as reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
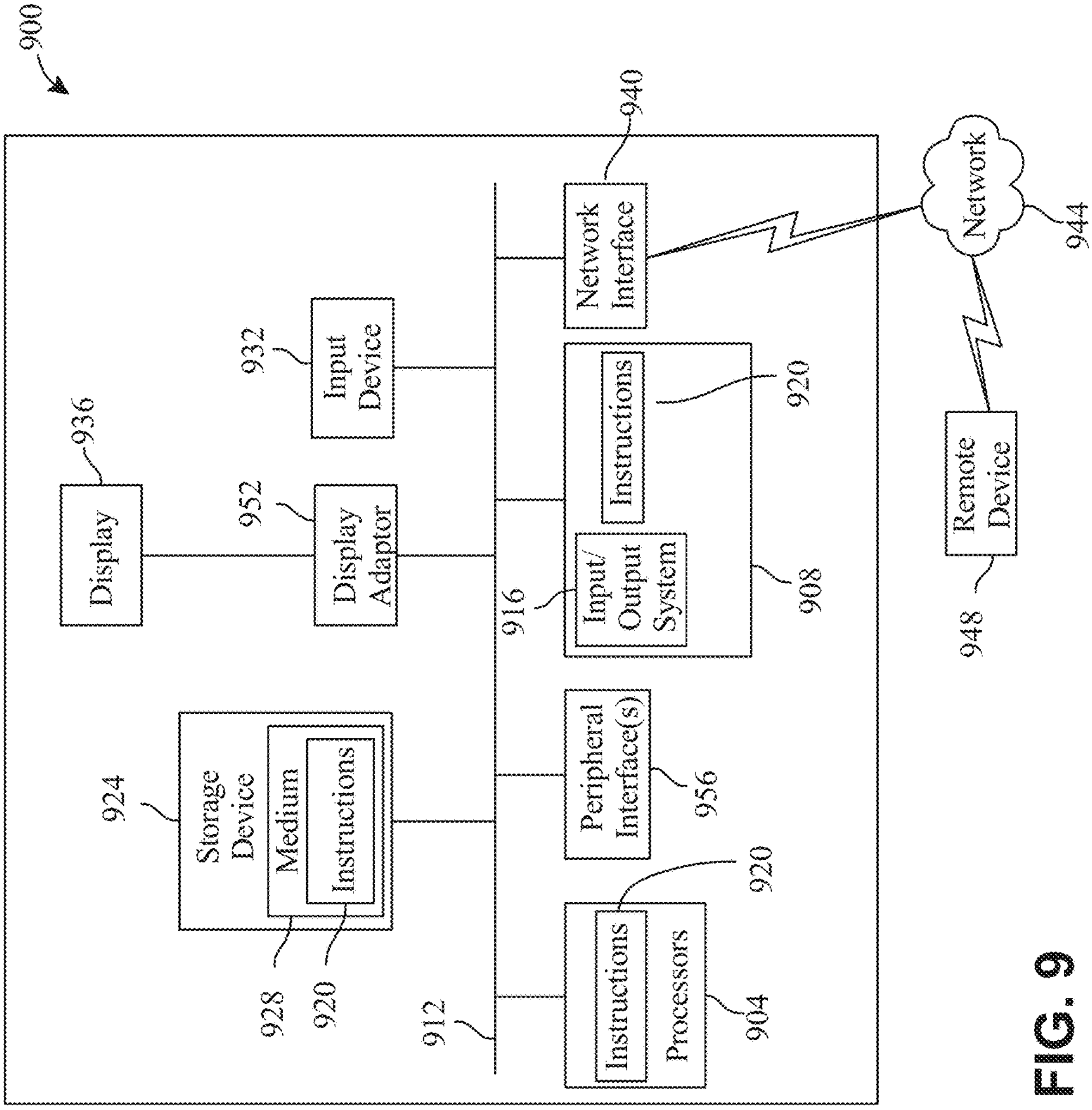
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for machine-learning model optimization for data attributes, the apparatus comprising:

at least a processor; and a memory communicatively connected to the at least a processor, wherein the memory contains instructions configuring the at least a processor to:

receive input data;

extract a plurality of attributes from the input data using an attribute machine learning model which comprises:

receiving the attribute training data, wherein the attribute training data correlates a plurality of exemplary input data to a plurality of exemplary attribute data;

training, iteratively, the attribute machine learning model using the training data, wherein training the attribute machine learning model includes retraining the attribute machine learning model with feedback from previous iterations of the attribute machine learning model; and extracting the plurality of attributes using the trained attribute machine learning model;

generate an optimized machine-learning module comprising a plurality of optimized machine-learning models, wherein generating the optimized machine-learning module comprises:

generating a plurality of sets of optimization training data, wherein each set of the plurality of sets of optimization training data comprises exemplary input data with different attributes correlated to exemplary output data; and training each of the plurality of optimized machine-learning models using each of the plurality of sets of optimization training data;

select at least one optimized machine-learning model from the plurality of trained optimized machine-learning models as a function of the plurality of attributes, wherein the plurality of trained optimized machine-learning models comprises a least a linear temporal model comprising a recurrent neural network configured to perform a time-series analysis to predict future data points, wherein selecting the at least one optimized machine-learning model comprises:

generating data samples as a function of the input data;

determining a compatibility score of the plurality of trained optimized machine-learning model with the input data using the data samples; and selecting the at least one optimized machine-learning model as a function of the compatibility score and the plurality of attributes; and generate output data comprising at least time-correlated data, as a function of the input data and the plurality of attributes using the selected optimized machine-learning model.

2. The apparatus of claim 1, wherein receiving the input data comprises receiving the input data from a database comprising a hierarchical data structure correlated to one or more hierarchical groups generated by a group classifier.

3. The apparatus of claim 1, wherein selecting the at least one optimized machine-learning model comprises:

generating classification training data, wherein the classification training data comprises exemplary attributes correlated to exemplary attribute labels;

training an attribute classifier using the classification training data;

classifying the plurality of attributes to one or more attribute labels; and selecting the at least one optimized machine-learning model as a function of the one or more attribute labels.

4. The apparatus of claim 1, wherein the optimized machine-learning module comprises at least two optimized machine-learning models that are arranged in parallel.

5. The apparatus of claim 1, wherein the optimized machine-learning module comprises at least two optimized machine-learning models that are arranged in series.

6. The apparatus of claim 1, wherein the optimized machine-learning module comprises at least two parallel model sets, wherein:

each of the at least two parallel model sets comprises at least two optimized machine-learning models that are arranged in series; and the at least two parallel model sets are associated with one attribute label of a plurality of attribute labels.

7. The apparatus of claim 6, wherein selecting the at least one optimized machine-learning model comprises:

assigning a weight to an output of each of the at least two parallel model sets; and determining one parallel model set from the at least two parallel model sets as a function of the weight.

8. The apparatus of claim 1, wherein generating the output data comprises generating a user interface displaying the output data on a user device, wherein the user interface comprises an interactive graphical user interface.

9. The apparatus of claim 8, wherein training each of the plurality of optimized machine-learning models comprises:

receiving a user input as a function of the displayed output data from the interactive graphical user interface;

updating the plurality of sets of optimization training data as a function of the user input; and retraining each of the plurality of optimized machine-learning models using the plurality of sets of updated optimization training data.

10. A method for machine-learning model optimization for data attributes, the method comprising:

receiving, using at least a processor, input data;

extracting, using the at least a processor, a plurality of attributes from the input data using an attribute machine learning model which comprises:

receiving the attribute training data, wherein the attribute training data correlates a plurality of exemplary input data to a plurality of exemplary attribute data;

training, iteratively, the attribute machine learning model using the training data, wherein training the attribute machine learning model includes retraining the attribute machine learning model with feedback from previous iterations of the attribute machine learning model; and extracting the plurality of attributes using the trained attribute machine learning model;

generating, using the at least a processor, an optimized machine-learning module comprising a plurality of optimized machine-learning models, wherein generating the optimized machine-learning module comprises:

generating a plurality of sets of optimization training data, wherein each set of the plurality of sets of optimization training data comprises exemplary input data with different attributes correlated to exemplary output data; and training each of the plurality of optimized machine-learning models using each of the plurality of sets of optimization training data;

selecting, using the at least a processor, at least one optimized machine-learning model from the plurality of trained optimized machine-learning models as a function of the plurality of attributes, wherein the plurality of trained optimized machine-learning models comprises a least a linear temporal model comprising a recurrent neural network configured to perform a time-series analysis to predict future data points, wherein selecting the at least one optimized machine-learning model comprises:

generating data samples as a function of the input data;

determining a compatibility score of the plurality of trained optimized machine-learning model with the input data using the data samples; and selecting the at least one optimized machine-learning model as a function of the compatibility score and the plurality of attributes; and generating, using the at least a processor, output data comprising at least time-correlated data, as a function of the input data and the plurality of attributes using the selected optimized machine-learning model.

11. The method of claim 10, wherein receiving the input data comprises receiving the input data from a database comprising a hierarchical data structure correlated to one or more hierarchical groups generated by a group classifier.

12. The method of claim 10, wherein selecting the at least one optimized machine-learning model comprises:

generating classification training data, wherein the classification training data comprises exemplary attributes correlated to exemplary attribute labels;

training an attribute classifier using the classification training data;

classifying the plurality of attributes to one or more attribute labels; and selecting the at least one optimized machine-learning model as a function of the one or more attribute labels.

13. The method of claim 10, wherein the optimized machine-learning module comprises at least two optimized machine-learning models that are arranged in parallel.

14. The method of claim 10, wherein the optimized machine-learning module comprises at least two optimized machine-learning models that are arranged in series.

15. The method of claim 10, wherein the optimized machine-learning module comprises at least two parallel model sets, wherein:

each of the at least two parallel model sets comprises at least two optimized machine-learning models that are arranged in series; and the at least two parallel model sets are associated with one attribute label of a plurality of attribute labels.

16. The method of claim 15, wherein selecting the at least one optimized machine-learning model comprises:

assigning a weight to an output of each of the at least two parallel model sets; and determining one parallel model set from the at least two parallel model sets as a function of the weight.

17. The method of claim 10, wherein generating the output data comprises generating a user interface displaying the output data on a user device, wherein the user interface comprises an interactive graphical user interface.

18. The method of claim 17, wherein training each of the plurality of optimized machine-learning models comprises:

receiving a user input as a function of the displayed output data from the interactive graphical user interface;

updating the plurality of sets of optimization training data as a function of the user input; and retraining each of the plurality of optimized machine-learning models using the plurality of sets of updated optimization training data.

* * * * *